United States Patent [19]

Giacobbe

[11] Patent Number: 5,099,799
[45] Date of Patent: Mar. 31, 1992

[54] ANIMAL COLLAR/LEASH DEVICE

[76] Inventor: Letterio Giacobbe, 842 Circuit St., Hanover, Mass. 02339

[21] Appl. No.: 570,523

[22] Filed: Aug. 21, 1990

[51] Int. Cl.$^5$ .............................................. A01K 27/00
[52] U.S. Cl. .................................... 119/106; 119/109
[58] Field of Search ................................ 119/106, 109

[56] References Cited

U.S. PATENT DOCUMENTS

| 2,289,802 | 7/1942 | Norton | 119/109 |
| 3,603,295 | 9/1971 | Shuman | 119/109 |
| 3,884,190 | 5/1975 | Gurrey | 119/109 |
| 4,224,901 | 9/1980 | Carey, Jr. | 119/106 |
| 4,584,967 | 4/1986 | Taplin | 119/109 |
| 4,887,552 | 12/1989 | Hayden | 119/109 |

FOREIGN PATENT DOCUMENTS

| 85/01857 | 5/1985 | PCT Int'l Appl. | 119/106 |
| 0859856 | 1/1961 | United Kingdom | 119/109 |
| 2109215 | 6/1983 | United Kingdom | 119/106 |

Primary Examiner—Robert P. Swiatek
Assistant Examiner—Todd E. Manahan

[57] ABSTRACT

A collar/leash device includes a unitary elongated flexible flat member having an outer surface and an inner surface, a first end section, and an opposing second end section. The first end section is provided with a buckle member including a frame member and a locking pin member that pivots on the inner end of the frame member. A plurality of apertures are disposed in spaced relationship through the flexible flat member at a preselected distance from the buckle member. The pin member is adapted to be insertable through a selected aperture in the flexible flat member whereby a collar section of selected size is provided by passing the opposing second end section through the buckle frame until the pin member is inserted through the selected aperture. The flexible flat member portion extending from the selected aperture to the second end section provides a leash section. Attaching members are provided for releasably fastening the leash section of the flexible flat member in wound position about the collar section when the leash section is not in use. The second end section is releasably attachable to selected points on the flexible flat member to provide a loop-like configuration which serves as a hand-grip loop section to be received by the hand of a person to hold the leash or to releasably connect the leash to a fixed object.

5 Claims, 2 Drawing Sheets

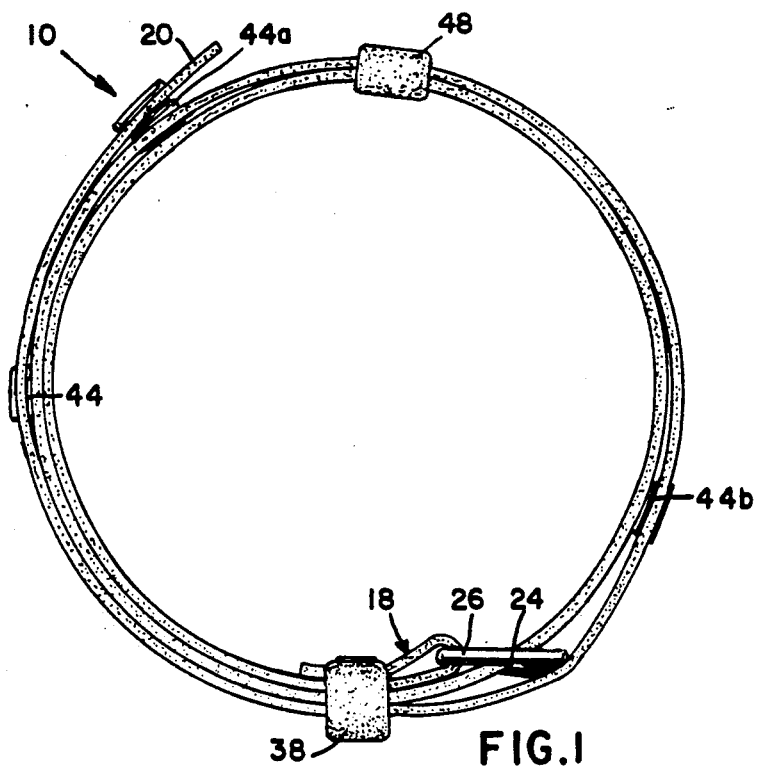
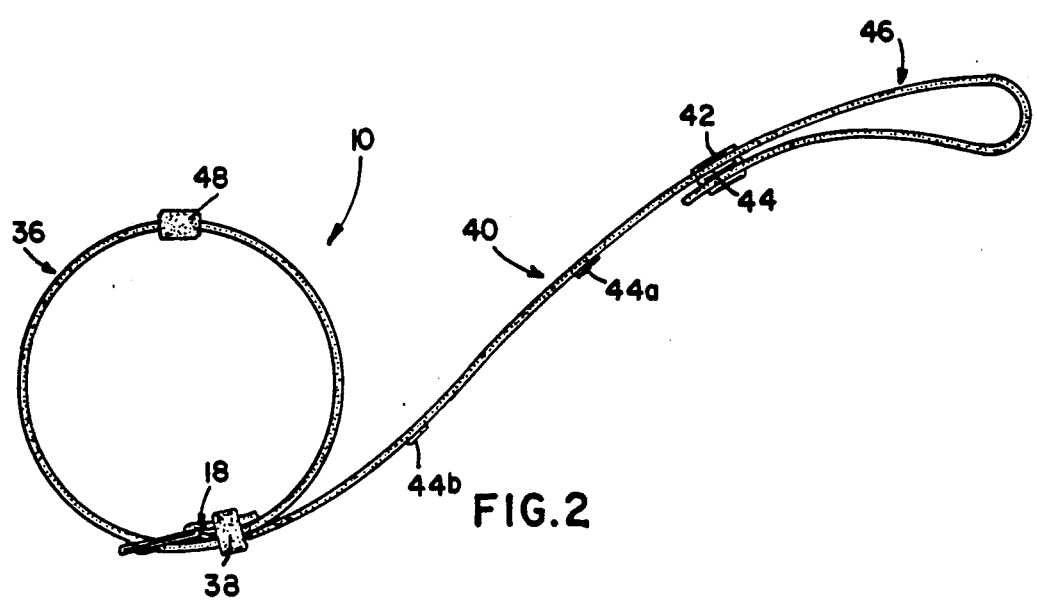

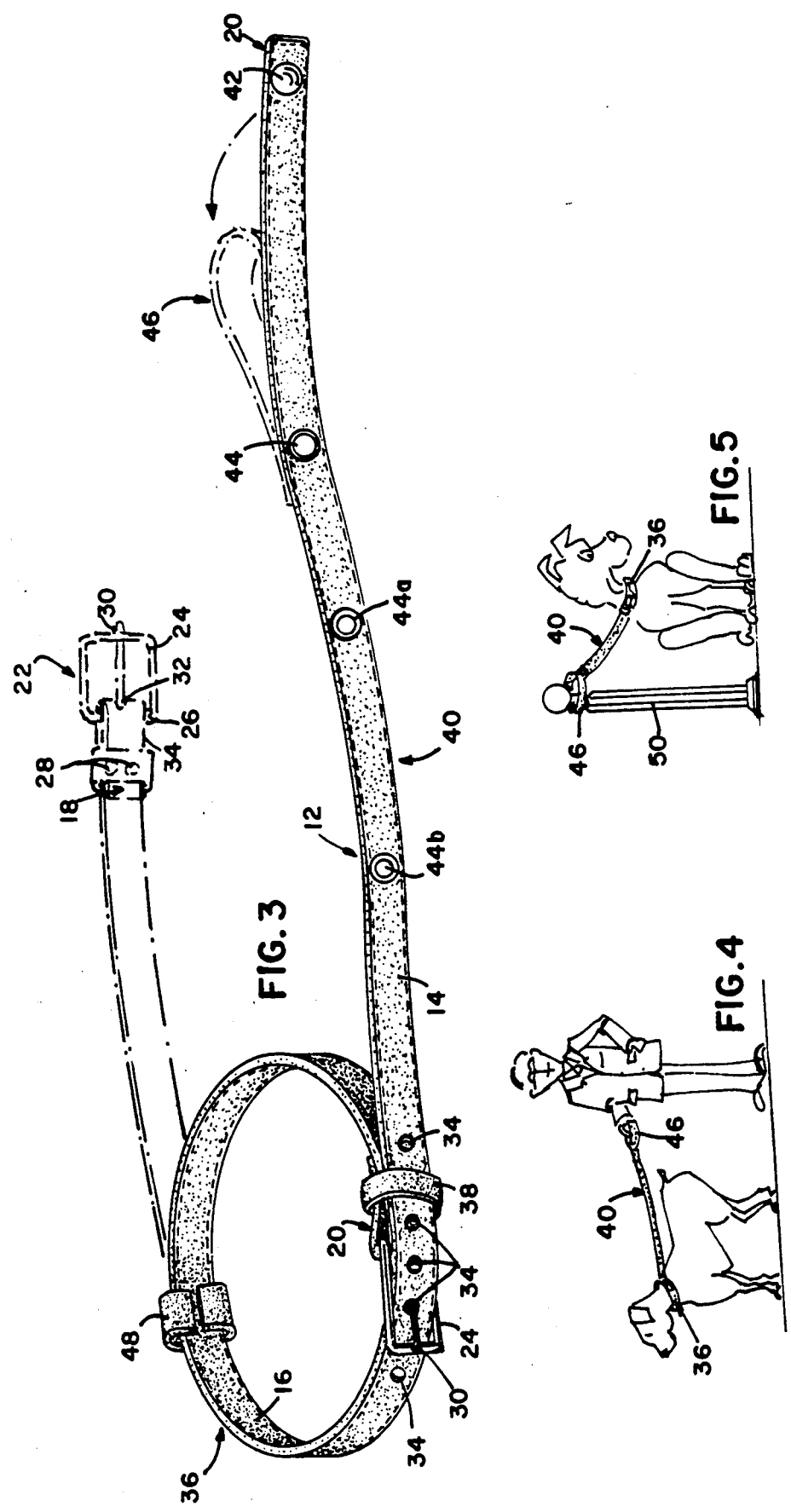

ANIMAL COLLAR/LEASH DEVICE

BACKGROUND OF THE INVENTION

1. Field Of The Invention

The present invention relates generally to animal collars and leashes and more particularly to a unitary collar/lease device for domestic animals such as dogs and cats.

2. Description Of The Prior Art

Numerous animal collars and leashes have been provided in the prior art, the present state of which is believed to be exemplified by the following U.S. Pat. Nos.: 4,787,340; 2,458,489; 426,137; 4,584,967; 4,763,609; 4,328,767;

While such prior art devices provide improvement in the areas intended, there still exists a need for a device which is constructed and arranged to provide a unitary collar/leash combination structure that is simple and easy to use as well as to manufacture.

Accordingly, a principle desirable object of the present invention is to overcome the disadvantages of the prior art.

Another desirable object of the present invention is to provide a flexible unitary continuous device which quickly and easily provides a pet neck encircling collar and when desired a collar and leash combination.

Another desirable object of the present invention is to provide a unitary collar/leash device that may remain on the pet as a wound collar when the leash portion is not in use.

A still further desirable object of the present invention is to provide a collar/leash device which can be quickly and easily adjusted to the size of the animal's neck as well as tightness about the neck.

Another desirable object of the present invention is to provide a collar/leash device in which the leash portion includes a hand-grip portion which also serves to releasably attach the leash portion to a fixed object.

A still further desirable object of the present invention is to achieve the above desirable objects with an essentially simple structure lending itself to inexpensive mass production.

These and other desirable objects of the present invention will in part appear hereinafter and will in part become apparent after consideration of the specification with reference to the drawings and the claims.

SUMMARY OF THE INVENTION

The present invention provides a new and improved collar/leash device for animals such as pet dogs and cats. The collar/leash device includes a unitary elongated flexible flat member having an outer surface and an inner surface, a first end section, and an opposing second end section. The first end section is provided with a buckle means including a frame member and a locking pin member that pivots on the inner end of the frame member. A plurality of apertures are disposed in spaced relationship through the flexible flat member at a preselected distance from the buckle means. The pin member is adapted to be insertable through a selected aperture in the flexible flat member whereby a collar section of selected size is provided by passing the opposing second end section through the buckle frame until the pin member is inserted through the selected aperture. Means are provided adjacent the inner end of the buckle frame member for releasably holding the pin member within the selected aperture of the flexible flat member. The flexible flat member portion extending from the selected aperture to the second end section provides a leash section. Means are provided for releasably fastening the leash section of said flexible flat member in wound position about the collar section when the leash section is not in use.

In a preferred embodiment the collar/leash device includes a hand-grip provided by means for releasably attaching the second end section at a selected point on the flexible flat member to provide a loop-like configuration. The second end section can be attached by suitable attaching means such as a frictional snap fastener. The hand-grip portion also serves to connect the leash to a fixed object.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein:

FIG. 1 is a top plan view of the collar/leash embodying the principles of the present invention in the wound collar position;

FIG. 2 is a top plan view of the leash/collar of the present invention in an extended leash position including a collar portion at one end and a hand-grip loop portion at the opposing end;

FIG. 3 is an enlarged perspective view of an alternate embodiment of the collar/leash in an extended position also showing the hand-grip loop in open position;

FIG. 4 is a perspective view showing a person walking a dog with the collar/leash of the present invention in the leash position; and FIG. 5 is a perspective view of a dog which is connected to a fixed object by the collar/leash in accordance with the present invention.

DETAILED DESCRIPTION OF THE PREFERRED EMBODIMENTS

Referring now to the drawings and more particularly to FIGS. 1-3, there is illustrated a new and improved collar/leash device, indicated generally by the reference numeral 10, embodying the principles of the present invention. The collar/leash device 10 includes primarily a unitary elongated flexible flat member 12 having an outer surface 14 and an inner surface 16 preferably made of leather, fabric, plastic or the like. The flexible flat member 12 terminates in a first end section 18 and an opposing second end section 20. The first end section 18 includes a buckle means 22 including a frame member 24. The second end portion 20 is folded through the inner end 26 of the frame member 24 and which is secured to the flexible member 12 by attaching means such as rivets 28. The buckle frame member 24 includes a locking pin member 30 that is pivotally attached to the inner end 26 of the buckle frame member 24 and extends through the hole 32 provided in the flat flexible member 14. The pivotal pin member 30 is adapted to be insertable through one of the apertures 34 which are disposed in spaced relationship through the flexible flat member 12 at a preselected distance from the buckle means 22 whereby a collar section of selected size, indicated by the reference numeral 36, is provided by passing the opposing second end section 20 through the buckle frame 24 until the pin member 30 is inserted through the selected aperture 34 to provide a collar section 36 of selected size as mentioned (as best seen in FIG. 3).

Means such as loop member 38 is provided for releasably holding the pin member within the selected aperture 34. The loop member 38 is attached to the flexible flat member 12 adjacent the inner end 26 of the frame member 24 and encircles the outer surface 14 of the flexible flat member 12.

The portion of the flexible flat member extending from the selected aperture to the opposing second end section 20 provides a leash section 40. The second end section 20 is provided with a fastening means such as a friction snap button 42 with a mating cooperative part 44 disposed on the inner surface 16 of the flat flexible member 12. As shown in FIGS. 3 and 4, the snap button 42 when looped and attached to the cooperative part 44 forms a hand-grip loop portion 46 as illustrated in phantom in FIG. 3.

Attached to the outer surface 14 of the flexible flat member 12 are two mating cooperative parts 44a and 44b. As best seen in FIG. 1, when the leash portion 40 is not in use, it is wound about the collar portion 36 and releasably held in the wound position on the animal by attaching the snap button 42 to one of the mating cooperative parts such as 44a, for example. It is to be understood that a plurality of mating cooperative button parts such as 44a and 44b can be attached to the outer surface 14 of the flexible member 12 to accommodate various collar sizes of different animals. In an alternate embodiment, additional loop means such as loop member 48 is attached to the inner surface 16 of the flexible flat member 12 and encircles the outer surface 14 in the same manner as loop member 38 and thereby serves to hold the collar/leash device in wound position when the leash portion is not in use on the pet animal or for storage purposes.

Referring now more particularly to FIGS. 4 and 5, there is illustrated the usefulness and advantage of the hand-grip portion 46. FIG. 4 illustrates the hand-grip loop. FIG. 5 illustrates the hand-grip portion attached about a fixed object such as post 50.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A collar/least device for animals comprising:
   an elongated flexible flat member having an outer surface and an inner surface and further having a first end section and an opposing second end section;
   said first end section having a buckle means comprising a frame member and a locking pin member that pivots on the inner end of said frame member;
   a plurality of apertures disposed in spaced relationship through said flexible flat member at a preselected distance from said buckle means;
   said pin member being insertable through a selected aperture in said flexible flat member whereby a collar section of selected size is provided by passing the opposing second end section through said buckle frame member until said pin member is inserted through the selected aperture;
   means for releasably holding said pin member within the selected aperture of the flexible flat member comprising;
   a loop member disposed about the flexible flat member adjacent the inner end of said frame member and having a portion of the inner surface of the loop member attached to the inner surface of the flexible flat member;
   said flexible flat member extending from the selected aperture to the second end section and providing a leash section;
   a frictional snap button attaching means attached adjacent the second end section of the flexible flat member; and
   a plurality of mating cooperative snap button means attached in spaced relationship about the outer surface of said flexible flat member whereby said leash section of said flexible flat member can be releasably fastened in wound position about the collar section when said leash section is not in use or the second end section releasably attached to a selected mating cooperative snap button means to form a loop section of selected size.

2. The collar/leash device according to claim 1 wherein said loop section is of sufficient size to be received by the hand of a person to hold the leash.

3. The collar/leash device according to claim 1 wherein said loop section is of sufficient size to be releasably attached to a fixed object.

4. The collar/leash device according to claim 1 wherein the elongated flexible flat member is formed of a leather material.

5. The collar/leash device according to claim 1 wherein the elongated flexible flat member is formed of a plastic material.

* * * * *